US008964582B2

(12) United States Patent
Wilkinson (10) Patent No.: US 8,964,582 B2
(45) Date of Patent: Feb. 24, 2015

(54) DATA INTEGRITY SCORING AND VISUALIZATION FOR NETWORK AND CUSTOMER EXPERIENCE MONITORING

(75) Inventor: Robert Todd Wilkinson, Plano, TX (US)

(73) Assignee: Tektronix, Inc., Beaverton, OR (US)

( * ) Notice: Subject to any disclaimer, the term of this patent is extended or adjusted under 35 U.S.C. 154(b) by 242 days.

(21) Appl. No.: 13/461,467

(22) Filed: May 1, 2012

(65) Prior Publication Data

US 2013/0163438 A1  Jun. 27, 2013

Related U.S. Application Data

(60) Provisional application No. 61/580,487, filed on Dec. 27, 2011.

(51) Int. Cl.
*H04L 12/26* (2006.01)
*H04J 1/16* (2006.01)
(Continued)

(52) U.S. Cl.
CPC ............. *H04L 43/50* (2013.01); *H04L 41/5009* (2013.01); *H04L 43/08* (2013.01)
USPC .......................................... 370/252; 709/224

(58) Field of Classification Search
CPC ....... H04L 43/00; H04L 43/04; H04L 43/045; H04L 43/06; H04L 43/08; H04L 43/0805; H04L 43/0817; H04L 43/0823; H04L 43/0829; H04L 43/0835; H04L 43/0847; H04L 43/0852; H04L 43/0858; H04L 43/0864; H04L 43/087; H04L 43/0876
USPC .......................................... 370/241, 252, 352
See application file for complete search history.

(56) References Cited

U.S. PATENT DOCUMENTS 6,826,513 B1    11/2004  Kumar et al.
8,364,141 B1 *   1/2013  Kateley et al. ................ 455/423
(Continued)

FOREIGN PATENT DOCUMENTS

GB  2 449 959 A     12/2008
WO   01/35609 A1    5/2001

OTHER PUBLICATIONS

"A Flexible Approach to Mobile Telephone Traffic Mass Measurements and Analysis", Peter Tatai et al, 2001, IEEE.*

(Continued)

*Primary Examiner* — Habte Mered
(74) *Attorney, Agent, or Firm* — Edwards Wildman Palmer LLP; Scott D. Wofsy; Christopher J. Capelli (57) ABSTRACT

Systems and methods for data integrity scoring and visualization for network and customer experience monitoring are described. In some embodiments, a method may include receiving a first set of vectors, each vector representing a network event generated by a network testing system, each vector including a plurality of dimensions and a first plurality of values, each value associated with a corresponding one of the dimensions. The method may also include identifying a second set of vectors representing at least a portion of the network events as observed by a network monitoring system, each vector in the second set of vectors including the plurality of dimensions and a second plurality of values. The method may further include calculating a presence score as a ratio between a number of vectors in the second and first sets of vectors, and/or an accuracy score as a measure of a discrepancy between corresponding values.

18 Claims, 3 Drawing Sheets

(51) Int. Cl.
*G06F 11/00* (2006.01)
*H04J 3/14* (2006.01)
*H04L 12/24* (2006.01)

(56) References Cited

U.S. PATENT DOCUMENTS

2007/0105544 A1* 5/2007 Veres et al. ............... 455/423
2009/0157447 A1* 6/2009 Busch ............................. 705/7
2011/0113358 A1* 5/2011 Nielsen et al. ............... 715/765
2013/0182579 A1* 7/2013 Turgeon et al. ............. 370/241

OTHER PUBLICATIONS

European Search Report issued Mar. 19, 2013 in corresponding European Patent Application No. EP 12199482.6.

* cited by examiner

DATA INTEGRITY SCORING AND VISUALIZATION FOR NETWORK AND CUSTOMER EXPERIENCE MONITORING

CROSS-REFERENCE TO RELATED APPLICATION

This application claims the benefit of the filing date of U.S. Provisional Patent Application No. 61/580,487 titled "Automated Data Integrity Scoring and/or Visualization For Network and/or Customer Experience Monitoring" and filed Dec. 27, 2011, the disclosure of which is hereby incorporated by reference herein in its entirety.

TECHNICAL FIELD

This specification is directed, in general, to network monitoring, and, more particularly, to systems and methods for data integrity scoring and visualization for network and customer experience monitoring.

BACKGROUND

Network and customer experience monitoring solutions are widely accepted standards for the operations of carrier service provider networks across both fixed networks (e.g., Cable/MSO, IP broadband such as DSL, FTTH, etc.) and mobile networks (e.g., 2.5G, 3G, LTE, etc.). These systems monitor network traffic via probe devices, then process that traffic through a variety of stages to derive actionable information as it pertains to subscriber experience (quality of service, quality of experience), subscriber behavior (application usage, service usage, etc.), subscriber location, etc. In practice, actionable information may refer to statistical indicators (typically referred to as Key Performance Indicators or KPIs) that are computed from source data processed by the probes, and then made available to various different user constituents at the carrier for the purpose of driving their business process.

A few examples of KPIs include Handover Success (by node, location, etc.), Call Drop Ratio (by node, handset, etc.), Application Usage (by node, subscriber, etc.), Subscriber Count (by location, demographic, etc.), and the like.

As the inventor hereof has recognized, there are multiple macro-level drivers present in the market today that impact the Carrier Service Providers (CSPs) in ways that may affect their deployment and usage of monitoring systems and KPIs. For example, because of downward pressure on subscriber growth, subscriber Average Revenue Per User (ARPU), growing network complexity, etc., CSPs must continually improve operational efficiency. A major way CSPs improve efficiency is by increased reliance on KPIs that embed directly into business processes and automation. That is, CSPs increasingly rely on accurate data to make real-time operational decisions about activity on the network. Also, there is an increasing push for CSPs to leverage data present on their networks to enable new revenue streams. A few examples include using subscriber behavior data to better target additional CSP service offerings, packaging aggregated data about subscriber interests and behaviors to third party advertisers, etc.

Taken together, these drivers mean the following: availability and accuracy of KPIs are more important than ever because KPIs obtained from monitoring systems are increasingly going to trigger network, business, and potentially revenue impacting decisions. As such, the inventor hereof has identified a need for systems and methods that provide the ability to present users with a confidence interval for a given KPI so that they can more fully appreciate the significance of a metric before they take a network or business impacting action. As the inventor hereof further recognized, however, most KPI estimation methods rely upon a relatively manual activity to correlate information between the multitude of different systems (active test, element management systems, etc.) available at the carrier. For example, there is no existing solution that provides a fully automated process that embeds the integrity measure directly with the KPIs so that they are readily available to any user in any context.

SUMMARY

Embodiments of systems and methods for data integrity scoring and visualization for network and customer experience monitoring are described herein. In an illustrative, non-limiting embodiment, a method may include receiving a first set of vectors, each vector in the first set of vectors representing a network event generated, at least in part, by a telecommunication network testing system, each vector in the first set of vectors including a plurality of dimensions and a first plurality of values, each of the first plurality of values associated with a corresponding one of the plurality of dimensions. The method may also include identifying a second set of vectors representing at least a portion of the network events as observed by a telecommunication network monitoring system distinct from the telecommunication network testing system, each vector in the second set of vectors including the plurality of dimensions and a second plurality of values, each of the second plurality of values associated with a corresponding one of the plurality of dimensions, and each vector in the second set of vectors corresponding to and/or correlated with a respective vector in the first set of vectors. The method may further include calculating a presence score as a ratio between a number of vectors in the second set of vectors and a number of vectors in the first set of vectors.

In some embodiments, the plurality of dimensions may include at least one of: International Mobile Equipment Identity (IMEI), International Mobile Subscriber Identity (IMSI), Mobile Station Integrated Services Digital Network (MSISDN), User Agent (UA) Profile, User Agent, Handset Make, Handset Model, Software Version, Uniform Resource Locator (URL), Service, Application, Location, Mobile Country Code (MCC), or Mobile Network Code (MNC). Moreover, the values associated with the plurality of dimensions may include at least one of: session length, uplink byte count, downlink byte count, number of attempts, number of failures, or latency.

In some implementations, the presence score may be associated with a geographic area where the telecommunication network testing system is disposed and/or with a subset of network elements involved in the transmission and/or reception of the network events generated at least in part by the telecommunication network testing system.

The method may also include calculating a Key Performance Indicator (KPI) for a selected one of the plurality of dimensions based, at least in part, upon values corresponding to the selected dimension in the second set of vectors, and calculating an integrity associated with the KPI, based, at least in part, upon the presence score. For the selected one of the plurality of dimensions, a first value in a first vector within the first set of vectors may be different from a second value in a second vector within the second set of vectors, the first and second vectors corresponding to the same network event.

The method may further include calculating, for the given one of the plurality of dimensions, an accuracy score as a measure of a discrepancy between the first and second values. For instance, the accuracy score may be calculated as a root-mean-square error (RSME) based on corresponding ones of the plurality of values. The method may then include displaying, graphically or textually, at least one of the presence score or the accuracy score to the user. For example, an indication of the presence and/or accuracy score(s) may be displayed in association with a respective geographic area and/or the subset of network elements.

In some embodiments, one or more of the techniques described herein may be performed using one or more computer systems. In other embodiments, a tangible computer-readable storage medium may have program instructions stored thereon that, upon execution by one or more computer or network monitoring systems, cause the one or more computer systems to perform one or more operations disclosed herein. In yet other embodiments, a system may include at least one processor and a memory coupled to the at least one processor, the memory configured to store program instructions executable by the at least one processor to perform one or more operations disclosed herein.

BRIEF DESCRIPTION OF THE DRAWINGS

Reference will now be made to the accompanying drawings, wherein.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

Figure 1:
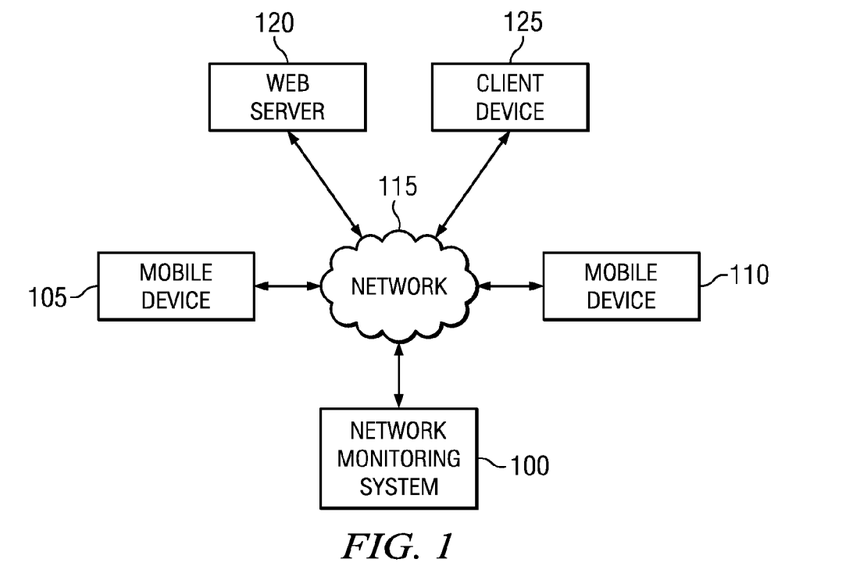
FIG. 1 is a block diagram of a network monitoring system according to some embodiments.

FIG. 1 illustrates a block diagram of a network monitoring system. As illustrated, mobile devices 105 and 110 may be capable of transmitting and receiving data (e.g., web pages, audio, video, etc.) to and from each other over network 115. Also, web server 120 may be configured to provide one or more web pages to client device 125 through network 115. In various embodiments, network 115 may include any suitable wired or wireless/mobile computer or data network including, for example, a third generation (3G), fourth generation (4G), or 3GPP Long Term Evolution (LTE) wireless networks, a voice-over-IP (VoIP) network, an IP Multimedia Subsystem (IMS) network, the Internet, etc.

Communications between mobile devices 105 and 110, as well as communications between web server 120 and client device 125, may be monitored by telecommunications network monitoring system 100, as data packets comprising those communications pass through network 115. As such, network monitoring system 100 may include a network monitor or analyzer, a packet sniffer, a probe, or the like, coupled to network 115. Protocols used to enable communications taking place in FIG. 1 may be selected, for instance, based upon the type of content being communicated, the type of network 115, and/or the capabilities of devices 105, 110, and/or 125. Examples of types of protocols that may be used include, but are not limited to, HyperText Transfer Protocol (HTTP), Real Time Messaging Protocol (RTMP), and Real-time Transport Protocol (RTP).

Each communication session for the various devices 105, 110, and/or 125 may have different start and stop times, and may be subject to different network traffic constraints. During each session, the available bandwidth for that session may change multiple times. Also, a data stream may start and stop during a given session.

Accordingly, network monitoring system 100 may be configured to sample (e.g., unobtrusively) related data packets for a communication session in order to track the same set of user experience information for each session and each client without regard to the protocol (e.g., HTTP, RTMP, RTP, etc.) used to support the session. For example, by calculating and/or presenting key performance indicator(s) (KPIs), as well as integrity scores for such KPIs, monitoring system 100 may be capable of identifying certain information about each user's experience, as described in more detail below. A service provider may use this information, for instance, to adjust the network services available to client devices 105, 110, and/or 125 such as the bandwidth assigned to each user, and the routing of data packets through network 115.

Generally speaking, client devices 105, 110, and 125 may include any computer system or device such as, for example, a personal computer, laptop computer, tablet computer, mobile device, smart phone, network-enabled devices, web-enabled televisions, and the like. Client devices 105, 110, and 125 may allow users to carry out voice communications, navigate the Internet or other data networks using a web browser application or the like via a Graphical User Interface (GUI), etc. Additionally or alternatively, client device 125 may access a content catalog made available by web server 120 through a stand-alone or web-based client application. Web server 120 may include any server or computer system capable of delivering content to device 125.

In some cases, one or more of devices 105, 110, and 125 may include a telecommunications network test system. Such a network test system may be, for example, an active test system configured to generate live traffic sessions capable of traversing nodes and other elements within network 115. In some embodiments, such a test system may include a mobile handset, laptop, or the like, executing test software configured to generate traffic and collect test results across a variety of dimensions. The test system may also be capable of transmitting or otherwise providing its test data (e.g., in the form of event vectors or the like) to monitoring system 100. Generally speaking, active network test systems are commercially available in various configurations, and the many techniques described herein are independent of which particular test system is used.

Furthermore, although only devices 105, 110, 120, and 125 are shown in FIG. 1, it will be understood network 115 may comprise any number of nodes and endpoints. For example, in some implementations, network 115 may include nodes or endpoints may be components in a 3G or 4G wireless network, such as a Serving GPRS Support Node (SGSN), Gateway GPRS Support Node (GGSN) or Border Gateway in a General Packet Radio Service (GPRS) network, Packet Data Serving Node (PDSN) in a CDMA2000 network, a Mobile Management Entity (MME) in a Long Term Evolution/Service Architecture Evolution (LTE/SAE) network or any other core network nodes or routers that transfer data packets or messages between endpoints. Moreover, it will be understood that such nodes and endpoints may be interconnected in any suitable manner, including being coupled to one or more other such nodes and/or endpoints.

As noted above, many packets traverse network 115 between endpoints. These packets may represent many different sessions and protocols. For example, if mobile device 105 (e.g., a network test system or handset) is used for a voice or video call, then it may exchange Voice over Internet Protocol (VoIP) or Session Initiation Protocol (SIP) data packets with a SIP/VoIP server (not shown) using Real-Time Transport Protocol (RTP). If mobile device 105 is used to send or retrieve email, it may exchange Internet Message Access Protocol (IMAP), Post Office Protocol 3 Protocol (POP3), or Simple Mail Transfer Protocol (SMTP) messages with an email server (not shown). If client device 105 is used to download or stream video, it may use Real Time Streaming Protocol (RTSP) to establish and control media sessions with web server 120. Alternatively, the user at mobile devices 105 and 110 or client device 125 may access a number of websites using Hypertext Transfer Protocol (HTTP) to exchange data packets with web server 120. It will be understood that packets exchanged between devices endpoints may conform to numerous other protocols now known or later developed.

In a typical situation, approximately one percent of the packets traversing network 115 carry control data, such as information for setting-up, managing or tearing-down calls or sessions between endpoints. The other ninety-nine percent of the packets carry user data, such as actual voice, video, email or information content to and from connected devices.

In various embodiments, network monitoring system 100 may be used to monitor the performance of network 115. To that end, monitoring system 100 may be configured to capture packets that are transported across network 115, both from actual network users (e.g., customers) and from network testing systems. In some embodiments, packet capture devices may be non-intrusively coupled to network links to capture substantially all of the packets transmitted across the links. It will be understood that, in an actual network, there may be dozens or hundreds of physical, logical or virtual connections and links between nodes. In some cases, network monitoring system 100 may be coupled to all or a high percentage of these links. In other embodiments, monitoring system 100 may be coupled only to a portion of network 115, such as only to links associated with a particular carrier or service provider. The packet capture devices may be part of network monitoring system 100, such as a line interface card, or may be separate components that are remotely coupled to network monitoring system 100 from different locations.

Monitoring system 100 may include one or more processors running one or more software applications that collect, correlate and/or analyze media and signaling data packets from network 115. Monitoring system 100 may incorporate protocol analyzer, session analyzer, and/or traffic analyzer functionality that provides OSI (Open Systems Interconnection) Layer 2 to Layer 7 troubleshooting by characterizing IP traffic by links, nodes, applications and servers on network 115. In some embodiments, these operations may be provided, for example, by the IRIS® toolset available from Tektronix, Inc., although other suitable tools may exist or be later developed. The packet capture devices coupling network monitoring system 100 to network 115 may be high-speed, high-density probes that are optimized to handle high bandwidth IP traffic, such as the GEOPROBE® G10, also available from Tektronix, Inc., although other suitable tools may exist or be later developed. A service provider or network operator may access data from monitoring system 100 via a user interface station having a display or graphical user interface, such as the IRISVIEW configurable software framework that provides a single, integrated platform for several applications, including feeds to customer experience management systems and operation support system (OSS) and business support system (BSS) applications, which is also available from Tektronix, Inc., although other suitable tools may exist or be later developed.

Monitoring system 100 may further comprise an internal or external memory for storing captured data packets, user session data, and configuration information. Monitoring system 100 may capture and correlate the packets associated with specific data sessions. In some embodiments, related packets may be correlated and combined into a record for a particular flow, session or call on network 115. These data packets or messages may be captured in capture files. A call trace application may be used to categorize messages into calls and to create Call Detail Records (CDRs). These calls may belong to scenarios that are based on or defined by the underlying network. In an illustrative, non-limiting example, related packets can be correlated using a 5-tuple association mechanism. Such a 5-tuple association process may use an IP correlation key that includes 5 parts: server IP address, client IP address, source port, destination port, and Layer 4 Protocol (Transmission Control Protocol (TCP), User Datagram Protocol (UDP) or Stream Control Transmission Protocol (SCTP)).

Accordingly, network monitoring system 100 may be configured to sample (e.g., unobtrusively) related data packets for a communication session in order to track the same set of user experience information for each session and each client without regard to the protocol (e.g., HTTP, RTMP, RTP, etc.) used to support the session. For example, monitoring system 100 may be capable of identifying certain information about each user's experience, as described in more detail below. A service provider may use this information, for instance, to adjust network services available to endpoints 105, 110, 120, and/or 125 such as the bandwidth assigned to each user, and the routing of data packets through network 115.

Network monitoring system 100 may also be configured to observe network events generated by an active test system (e.g., device 105). Network events obtained from the test system may be correlated with corresponding network events observed by monitoring system 100 and then used, for example, to generate data integrity scores as described in more detail in connection with FIGS. 4-6.

Figure 2:
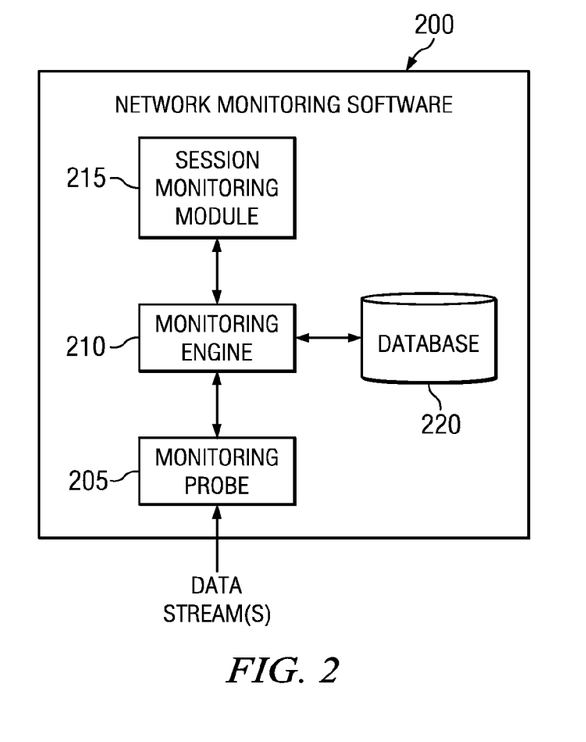
FIG. 2 is a block diagram of a network monitoring software program according to some embodiments.

Turning now to FIG. 2, a block diagram of a network monitoring software program is depicted. In some embodiments, network monitoring software 200 may be a software application executable by monitoring system 100 of FIG. 1. As previously noted, a plurality of communication sessions or data streams may be transmitted across network 115 between devices 105, 110, 120, and/or 125, one or more of which may be a network test system or the like. Such communications may be streamed over HTTP, RTMP, RTP, or any other suitable protocols.

Monitoring probe 205 may be configured to capture data packets from network 115, including, for example, data from one or more HTTP requests or sessions. As such, monitoring probe 205 may determine identifying information for the captured data packets and may combine related data into session or request records. Monitoring probe 205 may then feed session records and captured packet data to monitoring engine 210. In some cases, a session record may include multiple segments that are provided to monitoring engine 210 periodically while an associated session is active. Monitoring engine 210 may in turn be configured to extract session data from each session record and to identify the protocol for each session record.

Session data may be provided as a monitoring feed to session monitoring module 215 and/or may be stored to database 220. Database 220 may also store subscriber information and client device data.

Network monitoring software 200 may allow the service provider for network 115 to collect data from various HTTP requests or sessions concurrently or simultaneously. Data for multiple requests or sessions is stored in database 220, which allows the service provider to track each session or to extract system-wide parameters. For example, monitoring probe 205 and/or monitoring engine 210 may identity the type of protocol being used for each session by analyzing the header of one or more data packets for that session. In addition, monitoring software 200 may also receive test data from a network test system (e.g., device 105) and store those results in database 220.

Monitoring probe 205 and/or monitoring engine 210 may also track the bandwidth available to each VoIP session, and may identify bandwidth changes that occur in real-time. Moreover, monitoring probe 205 and/or monitoring engine 210 may detect when gaps or missing fragments occur in the stream of data packets for any of the requests or sessions. The requests or sessions parameters, bandwidth information, and gap data may be collected to database 200 and/or presented to the service provider.

Data stored in database 220 may be queried by the service provider, for example, on a per-session, per-user, per-device, or per-protocol basis. Session monitoring module 210 may use the collected information to generate Quality-of-Experience (QoE) and Key-Quality-Indicators (KQIs) for each session and for the overall network. The QoE and KQIs may be based, for example, on how often re-buffering, screen resolution changes, gaps, and/or missing fragments are detected. Excessive buffering during the session (i.e. re-buffering), numerous screen resolution changes, and gaps in the VoIP stream may lower a user's QoE.

Referring back to FIGS. 1 and 2, network monitoring system 100, under control of software 200, may also be configured to aggregate data to enable backhauling, to generate netflows and basic KPI calculations, time stamping of data, port stamping of data, filtering out unwanted data, protocol classification, and deep packet inspection (DPI) analysis. Examples of KPIs may include, but are not limited to, service performance indicators, network congestion indicators, connection maintenance indicators, service quality indicators, and/or network availability indicators. In addition, network monitoring system 100, may be further configured to perform stateful analysis of data, extraction of key parameters for call correlation and generation of call data records (CDRs), application specific processing, etc.

Figure 3:
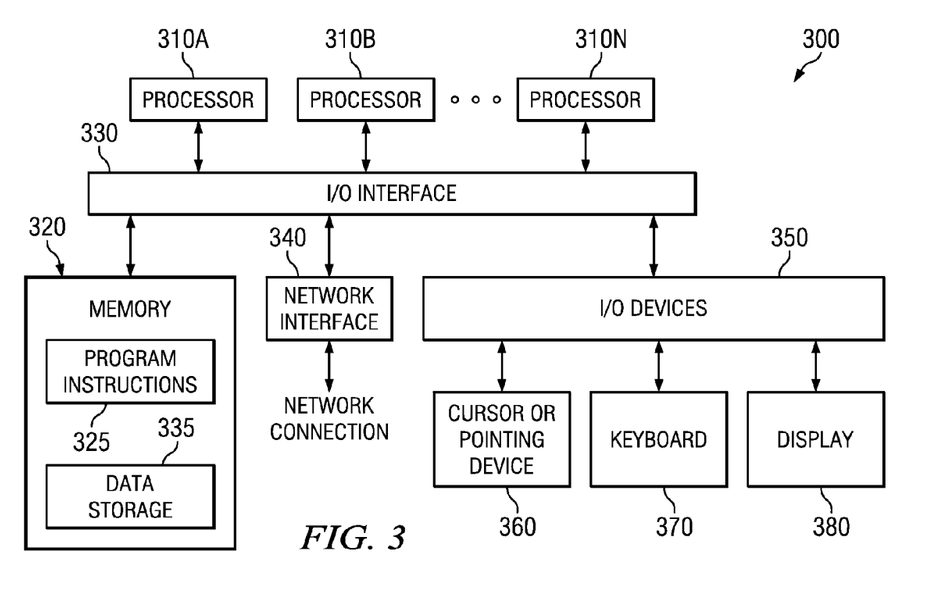
FIG. 3 is a block diagram of a computer system configured to implement various systems and methods described herein according to some embodiments.

Embodiments of network monitoring system 100 may be implemented or executed by one or more computer systems. One such computer system is illustrated in FIG. 3. In various embodiments, computer system 300 may be a server, a mainframe computer system, a workstation, a network computer, a desktop computer, a laptop, or the like. For example, in some cases, network monitoring system 100 shown in FIG. 1 may be implemented as computer system 300. Moreover, one or more of streaming server 120 or devices 105, 110, and 125 may include one or more computers in the form of computer system 300. As explained above, in different embodiments these various computer systems may be configured to communicate with each other in any suitable way, such as, for example, via network 115.

As illustrated, computer system 300 includes one or more processors 310 coupled to a system memory 320 via an input/output (I/O) interface 330. Computer system 300 further includes a network interface 340 coupled to I/O interface 330, and one or more input/output devices 350, such as cursor control device 360, keyboard 370, and display(s) 380. In some embodiments, a given entity (e.g., network monitoring system 110) may be implemented using a single instance of computer system 300, while in other embodiments multiple such systems, or multiple nodes making up computer system 300, may be configured to host different portions or instances of embodiments. For example, in an embodiment some elements may be implemented via one or more nodes of computer system 300 that are distinct from those nodes implementing other elements (e.g., a first computer system may implement monitoring probe 205 while another computer system may implement monitoring engine 210).

In various embodiments, computer system 300 may be a single-processor system including one processor 310, or a multi-processor system including two or more processors 310 (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or other dedicated graphics-rendering device.

System memory 320 may be configured to store program instructions and/or data accessible by processor 310. In various embodiments, system memory 320 may be implemented using any suitable memory technology, such as static random access memory (SRAM), synchronous dynamic RAM (SDRAM), nonvolatile/Flash-type memory, or any other type of memory. As illustrated, program instructions and data implementing certain operations as described herein may be stored within system memory 320 as program instructions 325 and data storage 335, respectively.

In other embodiments, program instructions and/or data may be received, sent or stored upon different types of computer-accessible media or on similar media separate from system memory 320 or computer system 300. Generally speaking, a computer-accessible medium may include any tangible storage media or memory media such as magnetic or optical media—e.g., disk or CD/DVD-ROM coupled to computer system 300 via I/O interface 330. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 340.

In an embodiment, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any necessary protocol, timing or other data transformations to convert data signals from one component (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. In addition, in some embodiments some or all of the functionality of I/O interface 330, such as an interface to system memory 320, may be incorporated directly into processor 310.

Network interface 340 may be configured to allow data to be exchanged between computer system 300 and other devices attached to network 115, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 350 may, in some embodiments, include one or more display terminals, keyboards, keypads, touch screens, scanning devices, voice or optical recognition devices, or any other devices suitable for entering or retrieving data by one or more computer system 300. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

As shown in FIG. 3, memory 320 may include program instructions 325, configured to implement certain embodiments described herein, and data storage 335, comprising various data accessible by program instructions 325. In an embodiment, program instructions 325 may include software elements of embodiments illustrated in FIG. 2. For example, program instructions 325 may be implemented in various embodiments using any desired programming language, scripting language, or combination of programming languages and/or scripting languages (e.g., C, C++, C#, JAVA®, JAVASCRIPT®, PERL®, etc). Data storage 335 may include data that may be used in these embodiments. In other embodiments, other or different software elements and data may be included.

A person of ordinary skill in the art will appreciate that computer system 300 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

In some embodiments, the systems described above may be configured to perform data integrity scoring and visualization for network and customer experience monitoring. For example, assume that monitoring probe 205 in network monitoring system 100 generates, for each observed network event ("event"), the following network event vector ("event vector" or "vector"):

$$(T, D_1, D_2, \ldots, D_n, V_0=1, V_1, V_2, \ldots, V_n)$$

where T is an event time, $D_X$ is a dimension, and $V_X$ is a value. Specifically, dimensions are fields present by which a KPI may be aggregated or viewed. Examples of "dimensions" may include, but are not limited to, subscriber (e.g., by International Mobile Subscriber Identity or IMSI, International Mobile Equipment Identity or IMEI, Mobile Subscriber Integrated Services Digital Network Number or MSISDN, etc.), cell, node, handset, User Agent (UA), UA profile, release code, Uniform Resource Locator (URL), Mobile Country Code (MCC), Mobile Network Code (MNC), etc. Meanwhile, a "value" may include any suitable numeric value that may be manipulated, aggregated, etc. to create a KPI. Examples of values may include: latency, byte counts (uplink and/or downlink), throughput, session length, number of attempts (e.g., connection attempts), number of failures (e.g., connection failures), etc. In the example shown above, $V_0=1$ may be used as a counter—i.e., it represents the occurrence of the event itself for the purpose of simple count KPIs (e.g., count of events with release cause X can be represented as sum($V_0$) where $D_{RC}=X$).

In various embodiments, a similar vector may be generated, at least in part, by a network testing system (e.g., device 105) during its normal operation. Such a test system is generally configured to generate a comparatively small (in proportion to total traffic) set of test calls, test sessions, etc. over some time period. Further, these test systems also have the ability to generate an event vector such as above that contains the result of each call/session. In event vectors generated by test systems, however, the dimensions may be different as active test systems tend to view the network as a "black box," and therefore may not have the network node level nor lower-level protocol stack visibility afforded to the network monitoring system. There may be, however, common dimensions, particularly time, subscriber ID (i.e., IMSI), and others that enable correlation between the active test event vectors and events generated by the monitoring system.

In that regard, let "$A_{events}$" be a set of event vectors from a network test system for a given time period, and let "$M_{events}$" represent event vectors as observed by the network monitoring system for a given time period. In a perfectly performing monitoring system with no missing events, $A_{events}$ would be a strict subset of $M_{events}$ (i.e., there should be a corresponding event or events for each event in $A_{events}$ in $M_{events}$). Furthermore, while some variation in values is expected, comparable values in the two different event vectors should be highly related in terms of statistical significance. For example, the active test agent perception of a measure like latency may be different from the monitoring system because the monitoring system is observing traffic at a different point in the network (e.g., the monitoring system may be coupled to an interface at the core of the network whereas the test system may be located at the edge of the network).

In some embodiments, an assessment of the presence of events may be performed, for example, to determine the extent to which an event is in $A_{events}$ but not in $M_{events}$, which may indicate a fault in the monitoring device. This type presence analysis may involve calculating a missing event ratio and/or presence score, which in turn may be used to calculate an integrity or confidence factor for a KPI based on values obtained from $A_{events}$, $M_{events}$, or a combination (or subset) thereof. In other words, presence analysis may estimate the proportion of actual data that is observable in the output of the monitoring system. Barring any catastrophically low value, the data sets for monitoring systems in CSP networks are typically sufficiently large enough that most non-count KPIs are still highly likely to be statistically accurate to a very high degree. Count-based KPIs, however, may suffer a % discrepancy that roughly corresponds to the missing event ratio.

Figure 4:
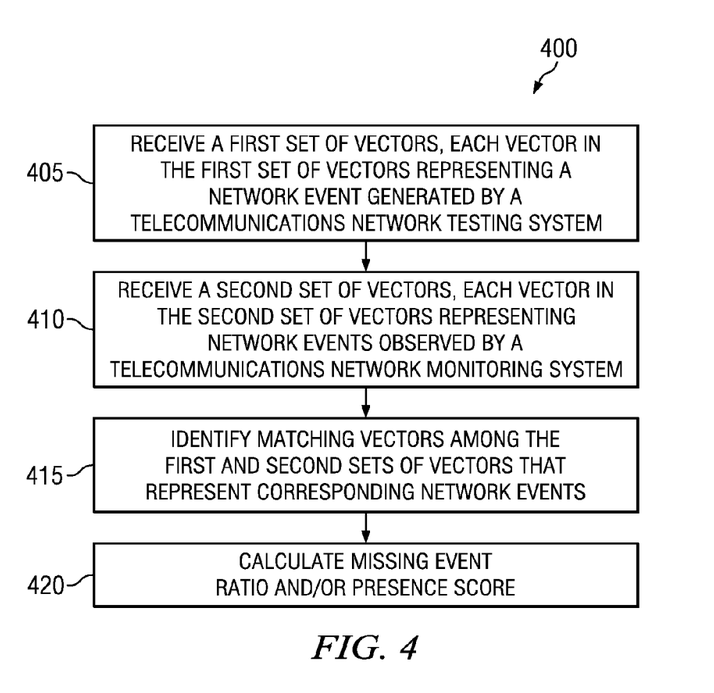
FIG. 4 is a flowchart of a method of performing presence analysis according to some embodiments.

Turning now to FIG. 4, a flowchart of a method of performing presence analysis is depicted. In some embodiments, method 400 may be performed, at least in part, by network monitoring system 100. At block 405, monitoring system 100 may receive a first set of vectors (e.g., $A_{events}$), each vector representing a network event generated by a telecommunications network testing system (e.g., device 105). At block 410, monitoring system 100 may receive a second set of vectors (e.g., $M_{events}$), each vector representing a network event as observed by monitoring system 100.

At block 415, monitoring system 100 may identify corresponding or matching vectors among the first and second set that represent corresponding or matching network events. For example, monitoring system 100 may correlate vectors from $A_{events}$ and $M_{events}$ using a time stamp (T) or other dimensions such as, for instance, IMEI, IMSI, etc. Then, at block 420, monitoring system 100 may calculate a missing event ratio. In some implementations, the missing event ratio may be proportional to the ratio between the number of matching events and the total number of events generated by the testing system (i.e., the total number of vectors in $A_{events}$). For sake of illustration, if the testing system generates 100 vectors but only 95 of those vectors can be correlated with vectors in $M_{events}$, then the missing event ratio is 5%. Conversely, in this example a "presence score" would be 95%.

Once the missing event ratio or presence score is calculated, it may enable calculation of an integrity or confidence value of factor for KPIs based upon $A_{events}$ and/or $M_{events}$. For example, the monitoring system may produce assume that one or more dimensions in these event vectors has been sampled with a sampling ratio equal to the presence score. In some embodiments, a KPI aggregation engine (e.g., within monitoring engine 210) may use the missing event ratio and/or presence score to properly calculate KPIs. Assume that the generic representation of a KPI is:

$(\Delta T, D_1, D_2, \ldots, D_n, K)$

In contrast with event vectors or descriptors, instead of a time value, KPIs may be calculated for a specific time range $\Delta T$. Also, KPIs may be computed per a set of dimensions— e.g., a subset of dimensions that were present in the event records. Moreover, KPIs computations typically yields a single value or result K, although it is quite common in implementations to compute a set of KPIs for the same dimensions and time ranges. As demonstrated above, both to properly calculate K, additional information may be used. Particularly, KPIs for an adaptive sampling system may be represented as:

$(\Delta T, D_1, D_2, \ldots, D_n, K, K_N, K_n, K_\sigma)$ where K represents the calculated KPI value (which is the general case is the sample mean), $K_N$ represents the number of events in the total population if no events had been missed (i.e., if presence score were 100%), which is equal to the number of vectors in $A_{events}$, $K_n$ represents the number of samples present for this KPI calculation, which in some cases may be the number of matching vectors corresponding to the same network events in both $A_{events}$ and $M_{events}$. Meanwhile, $K_\sigma$ represents the standard deviation of the observed values.

In some cases, with the additional calculations stored with the KPI, the system has enough information to either report a confidence interval (i.e., +/−X) given a target confidence factor, or to report a confidence factor (i.e., 95%) for a given interval range using the following formula:

$$X \pm t_{n-1} \frac{S}{\sqrt{n}} \sqrt{\frac{N-n}{N-1}}$$

where X represents the KPI result (K) or sample mean of corresponding values in the event vectors, $t_{n-1}$ is the "t" value obtained from standard statistical or distribution tables, S is the sample standard deviation ($K_\sigma$), n is the sample size ($K_n$), and N is the population size ($K_N$). Note the variant including finite population correction (fpc) factor (i.e., the fraction inside the radical) is used in "non-sampled" cases (i.e., sampling off whitelist sampling, etc.). Now, let:

$$A = \frac{s}{\sqrt{n}} \sqrt{\frac{N-n}{N-1}}$$

In some embodiments, a user may set a confidence level (i.e., 95%), which determines the t value and in turn determines a confidence interval equal to: +/−$t_{n-1}$A. Additionally or alternatively, the user can set an interval (X) and the confidence level is the associated t value for X/A.

Figure 5:
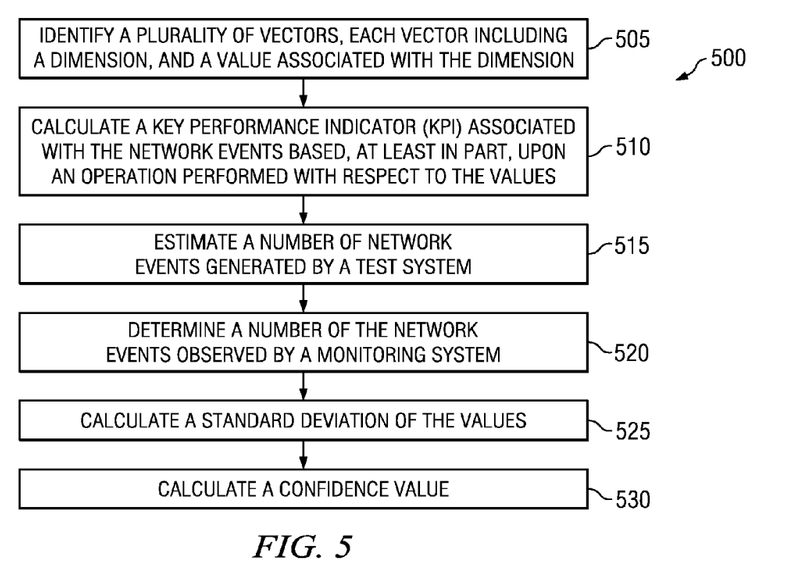
FIG. 5 is a flowchart of a method of calculating a confidence or integrity factor for a Key Performance Indicator (KPI) according to some embodiments.

In sum, once the sampling conditions with which particular events were observed or detected are identified in their corresponding vectors, it is possible to calculate a confidence factor or value associated with a KPI that is derived from those vectors. FIG. 5 is a flowchart of a method of calculating a confidence value for a KPI using a missing event or presence score. In some embodiments, method 500 may be performed, at least in part, by network monitoring system 100. At block 505, monitoring system 100 may identify a plurality of vectors representing observed, detected, or sampled network events, each vector including one or more dimensions and a value associated with each dimension.

At block 510, monitoring system 100 may calculate a KPI associated with a given one of the dimensions. For instance, the KPI may be calculated based upon an operation (e.g., mean, average, minimum, maximum, etc.) performed with respect to the values reported in the vectors. At block 515, monitoring system 100 may determine or otherwise estimate a number of network events ($K_N$) that would have been observed in the absence of missing events (e.g., the number of vectors in $A_{events}$). At block 420, monitoring system 100 may determine a number of matching network events ($K_n$) that can be correlated between $A_{events}$ and $M_{events}$. At block 525, monitoring system 100 may calculate a standard deviation ($K_\sigma$) of the values. And at block 530, monitoring system 100 may calculate a confidence value associated with the KPI, based, at least in part, upon $K_N$, $K_n$, and $K_\sigma$.

The integrity factors (e.g., confidence intervals and/or levels) may then be displayed to the user for visualization along with the KPI value. In some embodiments, such visualization may be graphically displayed on a computer screen. For example, shaded bars may extend above and below the value on a KPI graph. The visualization may also be textual (e.g., a +/− value represented next to the KPI value, etc.). It should be understood, however that, the systems and methods described herein are not limited to any one particular type of visualization, and other variations will be apparent in light of this disclosure.

As such, the systems and methods described herein may present an integrated (and properly calculated) confidence interval for the purpose of data integrity assessment or the like. Furthermore, the systems and methods described herein may address core customer business problems and many customer satisfaction issues, given their broad application (product/system level). The output of this assessment may include a set of confidence intervals and or confidence values derived using statistical techniques.

Once derived, the system makes available the appropriate confidence interval information for the scope that the user is viewing KPIs. For example, if the user is viewing KPIs for a specific Gateway GPRS Support Node (GGSN), the system may report a confidence interval derived from the corresponding accuracy assessment (these are done day-to-day or other period so proper one may be chosen) of that GGSN or the region/device that was monitoring it. In some embodiments, the systems and methods described herein are not limited to any one type of visualization. For example, the visualization may be graphical; shaded bars extending above and below the value on a KPI graph, and/or it may be textual; a +/− value represented next to the KPI value, etc.

Figure 6:
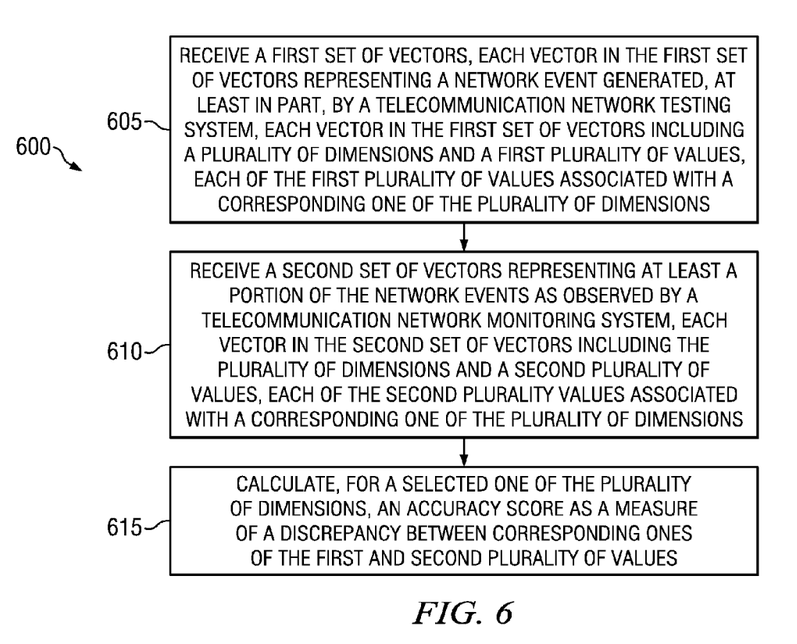
FIG. 6 is a flowchart of a method of performing accuracy analysis according to some embodiments.

In some embodiments, an accuracy analysis may estimate how accurately the monitoring system is reflecting real user/device experience regardless of whether all events were present or not. Particularly, even if the presence analysis is perfectly matched, there may still be significant inaccuracy of the data, which indicates a different type of fault on the monitoring system that is also a data integrity problem. In that regard, FIG. 6 is a flowchart of a method of performing accuracy analysis. In some embodiments, method 600 may be performed, at least in part, by network monitoring system 100. At block 605, network monitoring system 100 may receive a first set of vectors (e.g., $A_{events}$), each vector in the first set of vectors representing a network event generated, at least in part, by a telecommunication network testing system, each vector in the first set of vectors including a plurality of dimensions and a first plurality of values, each of the first plurality of values associated with a corresponding one of the plurality of dimensions.

At block 610, network monitoring system 100 may receive a second set of vectors (e.g., matching or correlated vectors between $A_{events}$ and $M_{events}$ corresponding to the same network events) representing at least a portion of the network events as observed by a telecommunication network monitoring system, each vector in the second set of vectors including the plurality of dimensions and a second plurality of values, each of the second plurality of values associated with a corresponding one of the plurality of dimensions. Then, at block 615, network monitoring system 100 may calculate, for a selected one of the plurality of dimensions, an accuracy score as a measure of a discrepancy between corresponding ones of the first and second plurality of values. For example, in some implementations, the discrepancy may be calculated as a root-mean-square error (RSME) based on corresponding ones of the plurality of values—i.e., RSME may be used to calculate the average error between actual and monitored event sets. In other implementations, however, the accuracy score may be given by other suitable mathematical operations.

In various embodiments, the presence and/or accuracy assessments referenced herein may be performed to different levels of geographical locales and not just globally. This is because the accuracy and availability of data is generally most highly correlated to the functioning state of network equipment and monitoring equipment involved in the generation and monitoring of events, which are geographically dispersed. Essentially, it is a common occurrence that one monitoring device is operating quite differently than another in the same network because of different configuration, traffic, state, etc. at that location.

Accordingly, presence and accuracy scores may be mapped, for example, to geographic area(s) where the network testing system is disposed and/or to a subset of network elements involved in the network events generated by the network testing system. In some cases, the test system (e.g., device 105) may be physically moved to different geographic areas or points in the network and the techniques described above may be repeated so as to generate a mapping of presence and/or accuracy scores.

The various techniques described herein may be implemented in software, hardware, or a combination thereof. The order in which each operation of a given method is performed may be changed, and various elements of the systems illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:
1. A method, comprising:
performing, using one or more computer systems,
receiving a first set of vectors, each vector in the first set of vectors representing a network event generated, at least in part, by a telecommunication network testing system, each vector in the first set of vectors including a plurality of dimensions and a first plurality of values, each of the first plurality of values associated with a corresponding one of the plurality of dimensions;
identifying a second set of vectors representing at least a portion of the network events as observed by a telecommunication network monitoring system distinct from the telecommunication network testing system, each vector in the second set of vectors including the plurality of dimensions and a second plurality of values, each of the second plurality of values associated with a corresponding one of the plurality of dimensions, and each vector in the second set of vectors correlated to a vector in the first set of vectors;
calculating a presence score as a ratio between a number of vectors in the second set of vectors and a number of vectors in the first set of vectors;
calculating a Key Performance Indicator (KPI) indicative of user's experience quality for a selected one of the plurality of dimensions based, at least in part, upon values corresponding to the selected dimension in the second set of vectors;
calculating a data integrity confidence value indicative of accuracy of the calculated KPI, based, at least in part, upon the presence score; and to adjust network services available to the user based on the calculated KPI and the calculated data integrity confidence value.

2. The method of claim 1, wherein the plurality of dimensions includes at least one of: International Mobile Equipment Identity (IMEI), International Mobile Subscriber Identity (IMSI), Mobile Station Integrated Services Digital Network (MSISDN), User Agent (UA) Profile, User Agent, Handset Make, Handset Model, Software Version, Uniform Resource Locator (URL), Service, Application, Location, Mobile Country Code (MCC), or Mobile Network Code (MNC).

3. The method of claim 1, wherein the values associated with the plurality of dimensions include at least one of: session length, uplink byte count, downlink byte count, number of attempts, number of failures, or latency.

4. The method of claim 1, wherein the presence score is associated with a geographic area where the telecommunication network testing system is disposed.

5. The method of claim 1, wherein the presence score is associated with a subset of network elements involved in the network events generated at least in part by the telecommunication network testing system.

6. The method of claim 1, wherein for the selected one of the plurality of dimensions, a first value in a first vector within the first set of vectors is different from a second value in a second vector within the second set of vectors, the first and second vectors corresponding to the same network event.

7. The method of claim 1, wherein calculating a data integrity confidence value further comprises:
performing, using the one or more computer systems, calculating, for the given one of the plurality of dimensions, an accuracy score as a measure of a discrepancy between the first and second values.

8. The method of claim 7, further comprising:
performing, using the one or more computer systems, calculating a root-mean-square error (RSME) based on corresponding ones of the plurality of values.

9. The method of claim 7, further comprising:
performing, using the one or more computer systems, displaying, graphically or textually, at least one of the presence score or the accuracy score to the user.

10. A system, comprising:
a processor; and
a memory coupled to the processor, the memory configured to store program instructions executable by the processor to cause the system to:
receive a first set of vectors, each vector in the first set of vectors representing a network event generated, at least in part, by a telecommunication network testing system, each vector in the first set of vectors including a plurality of dimensions and a first plurality of values, each of the first plurality of values associated with a corresponding one of the plurality of dimensions;
identify a second set of vectors representing at least a portion of the network events as observed by a telecommunication network monitoring system distinct from the telecommunication network testing system, each vector in the second set of vectors including the plurality of dimensions and a second plurality of values, each of the second plurality of values associated with a corresponding one of the plurality of dimensions, and each vector in the second set of vectors correlated to a vector in the first set of vectors;
calculate a Key Performance Indicator (KPI) indicative of user's experience quality for a selected one of the plurality of dimensions based, at least in part, upon values corresponding to the selected dimension in the second set of vectors;
calculate a data integrity confidence value indicative of accuracy of the calculated KPI; and adjust network services available to the user based on the calculated KPI and the calculated data integrity confidence value.

11. The system of claim 10, wherein to calculate the data integrity confidence value, the program instructions are further executable by the processor to cause the system to: calculate a root-mean-square error (RSME) based on corresponding ones of the first and second plurality of values.

12. The system of claim 10, wherein the data integrity confidence value is associated with a geographic area containing a subset of network elements involved in the network events generated by the telecommunication network testing system.

13. The system of claim 10, wherein the program instructions are further executable by the processor to cause the system to:
display an indication of a geographic area where the telecommunication network testing system is disposed or of a subset of network elements involved in the network events generated at least in part by the telecommunication network testing system; and
display an indication of the data integrity confidence value in the geographic area or for the subset of network elements.

14. A non-transitory tangible electronic storage medium having program instructions stored thereon that, upon execution by a processor within a computer system, cause the computer system to:
receive a first set of vectors, each vector in the first set of vectors representing a network event generated, at least in part, by a telecommunication network testing system, each vector in the first set of vectors including a plurality of dimensions and a first plurality of values, each of the first plurality of values associated with a corresponding one of the plurality of dimensions;
identify a second set of vectors representing at least a portion of the network events as observed by a telecommunication network monitoring system distinct from the telecommunication network testing system, each vector in the second set of vectors including the plurality of dimensions and a second plurality of values, each of the second plurality of values associated with a corresponding one of the plurality of dimensions, and each vector in the second set of vectors correlated to a vector in the first set of vectors;
calculate a presence score as a ratio between a number of vectors in the second set of vectors and a number of vectors in the first set of vectors;
calculate a Key Performance Indicator (KPI) indicative of user's experience quality for a selected one of the plurality of dimensions based, at least in part, upon values corresponding to the selected dimension in the second set of vectors;
calculate a data integrity confidence value indicative of accuracy of the calculated KPI, based, at least in part, upon the presence score, the data integrity confidence value comprising a measure of a discrepancy between corresponding ones of the first and second plurality of values; and adjust network services available to the user based on the calculated KPI and the calculated data integrity confidence value.

15. The non-transitory tangible electronic storage medium of claim 14, wherein to calculate the data integrity confidence value, the program instructions, upon execution by the processor further cause the computer system to: calculate a root-mean-square error (RSME) based on corresponding ones of the plurality of values.

16. The non-transitory tangible electronic storage medium of claim 15, wherein the program instructions, upon execution by the processor, further cause the computer system to: receive a request for a KPI from a user; display the requested KPI to the user; and display, graphically or textually, at least one of the presence score or the data integrity confidence value to the user.

17. The non-transitory tangible electronic storage medium of claim 16, wherein the program instructions, upon execution by the processor, further cause the computer system to: display an indication of a geographic area where the telecommunication network testing system is disposed; and display at least one of the presence score or the data integrity confidence value associated with the geographic area.

18. The non-transitory tangible electronic storage medium of claim 16, wherein the program instructions, upon execution by the processor, further cause the computer system to: display a subset of network elements involved in the network events generated at least in part by the telecommunication network testing system; and display at least one of the presence score or the data integrity confidence value associated with the geographic area.

\* \* \* \* \*